(12) United States Patent
Barton et al.

(10) Patent No.: US 9,023,122 B2
(45) Date of Patent: May 5, 2015

(54) HYDROGEN GENERATOR WITH IMPROVED FLUID DISTRIBUTION

(75) Inventors: Russell H. Barton, New Westminster (CA); Jason L. Stimits, Avon, OH (US)

(73) Assignee: Intelligent Energy Limited, Loughborough (GB)

( * ) Notice: Subject to any disclaimer, the term of this patent is extended or adjusted under 35 U.S.C. 154(b) by 393 days.

(21) Appl. No.: 13/461,185

(22) Filed: May 1, 2012

(65) Prior Publication Data

US 2013/0028809 A1    Jan. 31, 2013

Related U.S. Application Data

(60) Provisional application No. 61/511,748, filed on Jul. 26, 2011.

(51) Int. Cl.
| | |
|---|---|
| *B01J 7/00* | (2006.01) |
| *C01B 3/06* | (2006.01) |
| *B01J 7/02* | (2006.01) |
| *H01M 8/06* | (2006.01) |
| *H01M 8/04* | (2006.01) |

(52) U.S. Cl.
CPC . *C01B 3/065* (2013.01); *B01J 7/02* (2013.01); *H01M 8/065* (2013.01); *H01M 8/0687* (2013.01); *H01M 8/04208* (2013.01); *Y02E 60/50* (2013.01); *Y02E 60/362* (2013.01)

(58) Field of Classification Search
CPC ..... Y02E 60/362; Y02E 60/364; Y02E 60/36; C01B 3/065; C01B 2203/066; C01B 2203/0405; C01B 3/08; C01B 13/0211; C01B 2203/0233; C01B 2203/04; C01B 2203/041; C01B 2203/0495; C01B 2203/06; C01B 2203/1017; C01B 2203/1223; C01B 3/0031

See application file for complete search history.

(56) References Cited

U.S. PATENT DOCUMENTS

| | | |
|---|---|---|
| 3,820,956 A | 6/1974 | Titterington et al. |
| 7,097,813 B2 | 8/2006 | Ord et al. |
| 7,666,386 B2 | 2/2010 | Withers-Kirby et al. |
| 7,976,786 B2 | 7/2011 | Damery et al. |
| 2003/0118505 A1* | 6/2003 | Andersen et al. ............. 423/650 |
| 2005/0106441 A1* | 5/2005 | Yamamoto et al. ............. 429/34 |
| 2006/0174952 A1* | 8/2006 | Curello et al. ........... 137/614.03 |
| 2007/0020172 A1 | 1/2007 | Withers-Kirby et al. |

(Continued)

FOREIGN PATENT DOCUMENTS

WO    2006135896 A2    12/2006

OTHER PUBLICATIONS

International Application No. PCT/US2012/035965: International Preliminary Report on Patentability, dated Jan. 28, 2014, 8 pages.

(Continued)

*Primary Examiner* — Imran Akram
(74) *Attorney, Agent, or Firm* — Baker and Hostetler LLP

(57) ABSTRACT

The invention is a hydrogen generator including a housing, a reaction area, a fluid reservoir, a pellet comprising a first reactant within the reaction area, a fluid comprising a second reactant within the fluid reservoir, a fluid flow path between the fluid reservoir and the reaction area, and a hydrogen outlet. The fluid flow path comprises a follower assembly biased toward the pellet, the follower assembly includes an articulated joint and a follower, and the second reactant can react with the first reactant in the reaction area to produce hydrogen gas and byproducts.

30 Claims, 2 Drawing Sheets

(56) References Cited

U.S. PATENT DOCUMENTS

| | | |
|---|---|---|
| 2007/0036711 A1 | 2/2007 | Fisher et al. |
| 2007/0037034 A1 | 2/2007 | Fisher et al. |
| 2007/0062115 A1* | 3/2007 | Berry et al. ............... 48/61 |
| 2008/0014481 A1 | 1/2008 | Fiebig |
| 2008/0026266 A1 | 1/2008 | Kobayashi |
| 2008/0026269 A1* | 1/2008 | Shurtleff et al. ........... 429/19 |
| 2008/0216906 A1 | 9/2008 | Curello et al. |
| 2009/0060833 A1 | 3/2009 | Curello et al. |
| 2009/0104481 A1 | 4/2009 | Mohring et al. |
| 2009/0119989 A1 | 5/2009 | Withers-Kirby et al. |
| 2009/0123342 A1* | 5/2009 | Sgroi et al. ............... 422/107 |
| 2009/0274595 A1 | 11/2009 | Fisher et al. |
| 2010/0129266 A1* | 5/2010 | Shurtleff et al. ........... 422/119 |
| 2010/0151361 A1* | 6/2010 | Adams et al. ............. 429/515 |
| 2011/0070151 A1 | 3/2011 | Braithwaite et al. |
| 2011/0159384 A1 | 6/2011 | Giuffrida et al. |
| 2011/0194992 A1* | 8/2011 | Barton et al. ............. 422/239 |
| 2012/0115054 A1* | 5/2012 | Wallace et al. ........... 429/413 |

OTHER PUBLICATIONS

Patent Cooperation Treaty (PCT), International Search Report and Written Opinion for Application No. PCT/US2012/035965, filed May 1, 2012, mailed Oct. 5, 2012, European Patent Office, Netherlands.

* cited by examiner

US 9,023,122 B2

HYDROGEN GENERATOR WITH IMPROVED FLUID DISTRIBUTION

CROSS REFERENCE TO RELATED APPLICATIONS

This application claims the benefit of U.S. Provisional Application No. 61/511,748, filed on Jul. 26, 2011.

FIELD OF THE INVENTION

This invention relates to a hydrogen gas generator, particularly a hydrogen generator for a fuel cell system.

BACKGROUND

Interest in fuel cell batteries as power sources for portable electronic devices has grown. A fuel cell is an electrochemical cell that uses materials from outside the cell as the active materials for the positive and negative electrode. Because a fuel cell does not have to contain all of the active materials used to generate electricity, the fuel cell can be made with a small volume relative to the amount of electrical energy produced compared to other types of batteries.

Fuel cells can be categorized according to the types of materials used in the positive electrode (cathode) and negative electrode (anode) reactions. One category of fuel cell is a hydrogen fuel cell using hydrogen as the negative electrode active material and oxygen as the positive electrode active material. When such a fuel cell is discharged, hydrogen is oxidized at the negative electrode to produce hydrogen ions and electrons. The hydrogen ions pass through an electrically nonconductive, ion permeable separator and the electrons pass through an external circuit to the positive electrode, where oxygen is reduced.

In some types of hydrogen fuel cells, hydrogen is formed from a fuel supplied to the negative electrode side of the fuel cell. In other types of hydrogen fuel cells, hydrogen gas is supplied to the fuel cell from a source outside the fuel cell. A fuel cell system can include a fuel cell battery, including one or more fuel cells, and a hydrogen source, such as a fuel tank, a hydrogen tank or a hydrogen generator. In some fuel cell systems, the hydrogen source can be replaced after the hydrogen is depleted. Replaceable hydrogen sources can be rechargeable or disposable.

A hydrogen generator uses one or more reactants containing hydrogen that can react to produce hydrogen gas. The reaction can be initiated in various ways, such as hydrolysis and thermolysis. For example, two reactants can produce hydrogen and byproducts. An accelerator and/or a catalyst can be used to increase the rate of reaction or catalyze the reaction. When the reactants react, reaction products including hydrogen gas and byproducts are produced.

Some types of hydrogen generators include a first reactant in solid form and a second reactant in fluid form. The first reactant can be formed into one or more solid forms, referred to herein as pellets. The first and second reactants are initially separated, and the second reactant is transported to come in contact with the first reactant, and the reactants react to produce hydrogen gas. Transport of the fluid can be controlled so that hydrogen is produced as need by an external device such as a fuel cell stack.

It is desirable for the first and second reactants to react efficiently and completely to provide the maximum quantity of hydrogen for a given hydrogen generator size. To accomplish this, good contact is required between the first and second reactants throughout the use of the hydrogen generator. Accumulation of byproducts around unconsumed portions of the pellet and accumulation (e.g., pooling) of fluid can both interfere with good contact between unreacted first and second reactants. Prior attempts have been made to improve the contact between the first and second reactants by providing good distribution of fluid to the pellet and removing byproducts from the vicinity of unconsumed portions of the pellet. Examples of such attempts are disclosed in U.S. Pat. Nos. 3,820,956 and 7,097,813, and in US Patent Publication Nos. 2008/0216906, 2009/0274595, 2008/0014481 and 2009/0104481. However, prior hydrogen generators have had a variety of shortcomings, and further improvement is desirable.

In view of the above, it is desirable to provide a hydrogen gas generator that can produce a maximum amount of hydrogen per unit volume of the hydrogen generator. Excellent reaction efficiency, with maximum use of reactants is desired, as is utilization of the internal volume of the hydrogen generator for all components. It is also desirable for the hydrogen generator to have a simple design, be easily manufactured and have a low cost.

SUMMARY

The above objects are met and the above disadvantages of the prior art are overcome by the present invention. One aspect of the present invention is a hydrogen generator comprising a housing, a reaction area, a fluid reservoir, a pellet comprising a first reactant within the reaction area, a fluid comprising a second reactant within the fluid reservoir, a fluid flow path between the fluid reservoir and the reaction area, and a hydrogen outlet. The fluid flow path includes a follower assembly that is biased toward the pellet, the follower assembly comprises an articulated joint and a follower, and the second reactant can react with the first reactant in the reaction area to produce hydrogen gas and byproducts.

The hydrogen generator can include one or more of the following features:
  the articulated joint includes at least one of a ball joint, a universal joint and a flexible joint in which a component can bend;
  the follower is pivotable;
  the follower includes a plurality of fluid outlets on a face facing the pellet;
  the follower assembly includes a fluid control mechanism configured to selectively adjust fluid flow through the plurality of fluid outlets based on an orientation of the follower; the fluid control mechanism can be part of the follower; the fluid control mechanism can include a plurality of valves;
  a fluid dispersion layer is disposed on a face of the follower; the fluid dispersion layer can include a porous, compressible material;
  the hydrogen gas is separated from the byproducts before passing through the hydrogen outlet;
  the hydrogen gas and the byproducts flow past the follower before passing through the outlet;
  the hydrogen gas and the byproducts flow through spaces around the follower;
  the hydrogen gas and the byproducts flow through openings in the follower;
  the hydrogen generator includes a byproduct containment area; the byproduct containment area can be separated from the reaction area by the follower; the byproduct containment area can separate the reaction area and the fluid reservoir; the reaction area and the byproduct containment area can be in a volume exchanging relationship; the fluid reservoir and the byproduct containment area can be in a volume exchanging relationship; the byproduct containment area can contain one or more filter members; the one or more filter members can include an initially compressed filter that can expand as the byproduct containment area enlarges;

the fluid reservoir includes a flexible container;

the reaction area is disposed adjacent to the fluid reservoir;

the fluid is transportable through the fluid flow path by a pump, either within or outside the hydrogen generator;

the fluid is transportable through the fluid flow path by pressure applied to the fluid reservoir, by a biasing member or a gas;

the follower is biased by a spring;

the first reactant includes a chemical hydride, preferably a borohydride, more preferably sodium borohydride;

the pellet further includes a reaction accelerator, preferably an acid, more preferably one or more of malic, citric, succinic and tartaric acid;

the pellet further includes a catalyst;

the fluid further includes a reaction accelerator, preferably an acid, more preferably one or more of malic, phosphoric, succinic and acetic acid; and the fluid further includes a catalyst.

These and other features, advantages and objects of the present invention will be further understood and appreciated by those skilled in the art by reference to the following specification, claims and appended drawings.

Unless otherwise specified, the following definitions and methods are used herein:

"effluent" means non-gaseous reaction products and unreacted reactants, solvents and additives;

"expand" when used in describing a filter means for the filter material to simultaneously increase in volume, increase in porosity and decrease in density and pertains only to the material of which the filter is made;

"initial" means the condition of a hydrogen generator in an unused or fresh (e.g., refilled) state, before initiating a reaction to generate hydrogen;

"volume exchanging relationship" means a relationship between two or more areas, chambers or containers within a hydrogen generator such that a quantity of volume lost by one or more of the areas, chambers or containers is simultaneously gained by one or more of the other areas, chambers or containers; the volume thus exchanged is not necessarily the same physical space, so volume lost in one place can be gained in another place.

Unless otherwise specified herein, all disclosed characteristics and ranges are as determined at room temperature (20-25° C.).

DESCRIPTION

Figure 1:
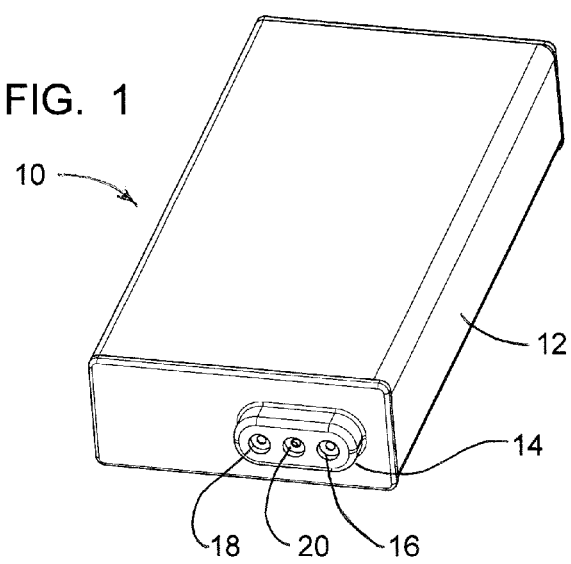
FIG. 1 is a perspective view of a hydrogen generator.

Hydrogen gas can be provided by the hydrogen generator to a hydrogen consuming apparatus such as a hydrogen fuel cell stack. The hydrogen consuming apparatus and the hydrogen generator can be incorporated into a system that includes controls for controlling the transfer of liquid from the liquid reservoir to the reaction area of the hydrogen generator.

A hydrogen generator according to the invention includes a housing containing two reactants, a first reactant in a solid form, and a second reactant in a fluid form, such as a liquid. Initially the first and second reactants are separate from each other. The first reactant is contained within a reaction area, and the second reactant is contained within a fluid reservoir. The composition containing the first reactant can be in the form of a powder, granules, agglomerates and the like, or it can be formed (e.g., by compressing or molding) into one or more solid shapes, such as a pellet, tablet, cake and the like. Preferably the first reactant is formed into a solid shape. For convenience, the solid is referred to below as a pellet, but it is understood that any solid form can be used, whether formed into a solid shape or not. The pellet can consist of only the first reactant, or it can contain other solid ingredients as well, as described in further detail below. The second reactant is contained in a fluid. The second reactant can be a fluid itself, or it can be contained in a fluid, such as by dissolving in a liquid or suspending in a suspension or gel. The fluid can consist of only the second reactant, or it can contain other ingredients as well, as described in further detail below.

The fluid is transported from the fluid reservoir, through a fluid flow path, to the reaction area, where the second reactant can come in contact and react with the first reactant. A catalyst can be used in some embodiments to catalyze the reaction. In some embodiments the rate of reaction can be controlled by other ingredients in one or both of the pellet and the fluid, or by other means such as heating or cooling or adding other materials to the reaction area. Hydrogen gas and byproducts are produced in the reaction area, and the hydrogen gas is separated from the byproducts and other liquids and solids (e.g., unconsumed pellet and fluid components) and can exit the hydrogen generator through a hydrogen outlet.

In some embodiments the hydrogen generator includes a byproduct containment area, separate from the reaction area and reservoir, into which the hydrogen gas and byproducts can flow from the reaction area. It is advantageous for components of the hydrogen generator to be in a volume exchanging relationship such that as the contents of one component are emptied, another component can expand to accommodate materials that are being added. For example, the byproducts containment area can be in a volume exchanging relationship with one or both of the fluid reservoir and the reaction area. If there is no byproducts containment area and byproducts are accumulated within the reaction area, the reaction area can be in a volume exchanging relationship with the fluid reservoir; this can be advantageous when the volume of the reaction products is greater than the combined volumes of the reactants. Volume exchange can contribute to the hydrogen generator's volume efficiency (the volume of hydrogen that can be produced divided by the volume of the hydrogen generator).

Fluid is transported from the fluid reservoir to the reaction area via the fluid flow path, which can be entirely within the hydrogen generator, or a portion can be located externally. Various methods can be used—examples include a pump, which can be internal or external to the hydrogen generator; pressure applied to the fluid reservoir, by a biasing member, hydraulic pressure or pneumatic pressure; or by pressurizing the fluid reservoir with a gas. The flow path can include various components such as pipes, tubes, valves and the like.

The fluid reservoir includes a liquid impermeable container. The container can be rigid or flexible. A flexible container can become smaller (e.g., by collapsing and/or contracting) as liquid is transported out of the reservoir, so that space initially occupied by the reservoir can be made available to an enlarging byproducts containment area. Examples of types of flexible containers include containers with walls having accordion folds, similar to a bellows; elastic containers that can stretch and contract in response to changes in pressure like a balloon; and containers made of non-elastic materials that are not rigid but also do not stretch or contract to a great extent. Examples of flexible, films include polyethylene, polypropylene, polyvinylchloride, rubber, latex, silicone, Viton, polyurethane, neoprene, buna-N, polytetrafluoroethylene, expanded polytetrafluoroethylene, perfluoroelastomers, and fluorosilicone.

The reaction area can have rigid walls to contain the pellet, generally on all sides but one. A follower is disposed on one side or end, adjacent to a surface of the pellet, and is biased against the pellet. It can be biased by a biasing member, such as a spring or a hydraulically or pneumatically operated mechanism. The follower can include a plurality of fluid outlets that are part of the fluid flow path from the fluid reservoir. The fluid outlets can be spaced on the face of the follower to provide good distribution of the fluid to the surface of the pellet.

The surface of the pellet facing the follower may not be consumed evenly during the reaction of the reactants. This can be the result of fluid flow due to gravity within the reaction area, non-uniform composition of the pellet, or other factors. With a follower having a fixed orientation, the follower may consequently be in contact with only a small portion of the surface of the pellet, resulting in reduced hydrogen generation, which in turn can initiate an increased rate of fluid supply to maintain the required hydrogen supply rate, and unreacted fluid can accumulate in areas within the reaction area that are not in good contact with unreacted first reactant.

According to the invention, the follower is articulated so the face of can move. As the follower is biased against the pellet, if the adjacent surface of the pellet is not parallel to the plane of the follower face, the follower can pivot to an orientation that will maximize the contact area between the follower and the pellet. For example, the portions of the pellet surface that have been consumed the least will project from the bulk of the pellet to a greater degree. As the follower is biased against the pellet, non-uniform contact between the follower face and the pellet can cause the follower to move, such as by pivoting. This can help orient the follower face to maximize contact between the follower face and the surface of the pellet. The follower assembly includes an articulated joint. Examples of articulated joints include but are not limited to ball joints, universal joints and other flexible joints in which components can bend.

In some embodiments, the hydrogen generator includes a fluid control mechanism configured to selectively control fluid flow through the plurality of fluid outlets based on the orientation of the follower. For example, if the follower face is in a plane that is perpendicular to the direction of the biasing force, fluid flow will be equal to all of the fluid outlets. If the plane of the follower face is not perpendicular to the direction of the biasing force, fluid flow will be greatest to the outlet(s) on the portion(s) of the face that have been displaced the most in the direction opposite the direction of the biasing force, and fluid flow will be the least to the outlet(s) on the portion(s) of the face that have been displaced the most in the same direction as the direction of the biasing force. The fluid control mechanism can be disposed within the follower or elsewhere. A fluid control mechanism within the follower can include valves, with each valve controlling fluid flow to one or more outlets.

The follower face can include a dispersion layer that will allow the fluid to disperse between the fluid outlets. The dispersion layer is preferably a porous material. It can be a material that is able to wick the fluid to the surface of the pellet, such as a hydrophilic material that can wick an aqueous fluid. The dispersion layer can be a compressible material. This has the added advantage of being able to better conform to the surface of the pill than would a rigid surface. Examples of materials for the dispersion layer include woven and nonwoven fibrous materials, foams and felts. The dispersion layer can be made from materials such as but not limited to nylon wools, silicone foams, rubber foams, polyethylene foams, Viton foams, polyurethane foams, neoprene foams, vinyl foams, acrylic fibers, polyimide foams, carbon felts, and polypropylene felts.

In some embodiments the hydrogen gas can exit the reaction area through spaces around or openings through the follower. Preferably a byproduct containment area is located on the opposite side of the follower from the reaction area. The hydrogen gas produced can carry the byproducts away from the pellet and out of the reaction area to help prevent blockage of the fluid from unreacted first reactant in the remaining pellet. It is advantageous for the byproducts containment area to be located on the opposite side of the follower from the reaction area because the follower is close to the main reaction sites, and effluent has to travel only a short distance to reach the byproduct containment area. The byproduct containment area can have a container, or space within the hydrogen generator housing can serve as a byproduct containment area. If the byproduct containment area has a container, it can be a flexible container, and the byproduct containment area can be in a volume exchanging relationship with the fluid reservoir and/or the reaction area.

Hydrogen gas is separated from the byproducts and unconsumed reactants before it leaves the hydrogen generator. This can be using one or more filter members. Filter members can be included in one or more locations in the hydrogen generator. For example, one or more filter elements can be located where the hydrogen exits the reaction area, such as in spaces around or openings through the follower. Filter members can be located within a byproduct containment area to help remove solids from the effluent. Such filter elements can be initially compressed to occupy a small volume and expand as the byproduct containment area expands to accommodate more solids without becoming clogged. A final filter member can be a hydrogen-permeable, liquid impermeable. A final filter element can be located between the reaction area and the hydrogen gas outlet, such as across the entrance to the hydrogen gas outlet, in a section of a container surrounding the byproducts containment area, or it can be the container surrounding the byproducts containment area, for example. Filter elements within the byproducts containment area can be porous, such as woven or nonwoven fibers, foams or felts. Filter elements within the byproduct containment area can be made of materials such as nylon wools, silicone foams, rubber foams, polyethylene foams, Viton foams, polyurethane foams, neoprene foams, vinyl foams, acrylic yarns, polyimide foams, carbon felts, polypropylene felts and the like. The final filter element can be a hydrogen permeable, liquid impermeable material; examples include polymeric materials such as fluoropolymers (e.g. polytetrafluoroethylene and polytetrafluoroethylene derivatives) and expanded fluoropolymers (e.g., expanded polytetrafluoroethylene).

If the byproduct containment area is enclosed by a liquid impermeable container, the hydrogen generator can also include a separate hydrogen containment area. The hydrogen containment area can contain a limited amount of hydrogen gas, as an initial supply of hydrogen that is available at startups, and/or to accumulate hydrogen gas that is produced after transport of fluid to the reaction area is stopped.

The hydrogen generator can use a variety of reactants that can react to produce hydrogen gas. At least one reactant is present in solid form in the reaction area and at least one reactant is present in a fluid in the fluid reservoir. Examples of reactants for producing hydrogen gas include chemical hydrides, alkali metal silicides, metal/silica gels, water, alcohols, dilute acids and organic fuels (e.g., N-ethylcarbazole and perhydrofluorene).

An alkali metal silicide is the product of mixing an alkali metal with silicon in an inert atmosphere and heating the resulting mixture to a temperature of below about 475° C., wherein the alkali metal silicide composition does not react with dry $O_2$. Such alkali metal silicides are described in US Patent Publication 2006/0002839. While any alkali metal, including sodium, potassium, cesium and rubidium may be used, it is preferred that the alkali metal used in the alkali metal silicide composition be either sodium or potassium. Metal silicides including a Group 2 metal (beryllium, magnesium, calcium, strontium, barium and radium) may also be suitable. In an embodiment, sodium silicide can react with water to produce hydrogen gas and sodium silicate, which is soluble in water.

A metal/silica gel includes a Group 1 metal/silica gel composition. The composition has one or more Group 1 metals or alloys absorbed into the silica gel pores. The Group 1 metals include sodium, potassium, rubidium, cesium and alloys of two or more Group 1 metals. The Group 1 metal/silica gel composition does not react with dry $O_2$. Such Group 1 metal/silica gel compositions are described in U.S. Pat. No. 7,410,567 B2 and can react rapidly with water to produce hydrogen gas. A Group 2 metal/silica gel composition, including one or more of the Group 2 metals (beryllium, magnesium, calcium, strontium, barium and radium) may also be suitable.

As used herein, the term "chemical hydride" is broadly intended to be any hydride capable of reacting with a fluid to produce hydrogen. Examples of chemical hydrides that are suitable for use in the hydrogen generating apparatus described herein include, but are not limited to, hydrides of elements of Groups 1-4 (International Union of Pure and Applied Chemistry (IUPAC) designation) of the Periodic Table and mixtures thereof, such as alkaline or alkali metal hydrides, or mixtures thereof. Specific examples of chemical hydrides include lithium hydride, lithium aluminum hydride, lithium borohydride, sodium hydride, sodium borohydride, potassium hydride, potassium borohydride, magnesium hydride, calcium hydride, and salts and/or derivatives thereof. Other compounds, such as nitrogen based compounds (e.g., ammonia borane) are also suitable. In an embodiment, a chemical hydride such as sodium borohydride can react with water to produce hydrogen gas and a byproduct such as a borate. This can be in the presence of a catalyst, heat, a dilute acid or a combination thereof.

Chemical hydrides can react with water to produce hydrogen gas and oxides, hydroxides and/or hydrates as byproducts. The hydrolysis reaction may require a catalyst or some other means of initiation, such as a pH adjustment or heating. A catalyst or acid can be included in the solid or in the fluid.

One or more catalysts can be used to catalyze the hydrogen producing reactions. Examples of suitable catalysts include transition metals from Groups 8 to 12 of the Periodic Table of the Elements (e.g., Rh, Pd, Pt), as well as other transition metals including scandium, titanium, vanadium, chromium and manganese. Metal salts, such as chlorides, oxides, nitrates and acetates can also be suitable catalysts.

The rate of hydrogen generation can be controlled in a variety of ways, such as controlling of the rate at which liquid is transported to the reaction area, adjusting the pH, and making thermal adjustments. The rate of hydrogen generation can be controlled to match the need for hydrogen gas. A control system can be used for this purpose, and the control system can be within or at least partially outside the hydrogen generator.

Additives can be used for various purposes. For example, additives can be included with a solid reactant as a binder to hold the solid material in a desired shape or as a lubricant to facilitate the process of forming the desired shape. Other additives can be included in the fluid or the pellet to control pH. Examples of such additives include but are not limited to acids (e.g., hydrochloric, nitric, sulfuric, citric, carbonic, boric, carboxylic, sulfonic, malic, phosphoric, succinic, tartaric and acetic acids or combinations thereof), or bases (e.g., hydroxides such as those of Group 1 elements, ammonium, and organic compounds; metal oxides such as those of Group 1 metals; and organic and metal amines). Additives such as alcohols and polyethylene glycol based compounds can be used to prevent freezing of the fluid. Additives such as surfactants, wetting agents and anti-foaming agents (e.g., glycols, polyglycols and polyols) can be used to control liquid surface tension and reaction product viscosity to facilitate the flow of hydrogen gas and/or effluents. Additives such as porous fibers (e.g., polyvinyl alcohol and rayon fibers) can help maintain the porosity of the pellet and facilitate even distribution of the fluid and/or the flow of hydrogen and effluents.

In one embodiment a chemical hydride such as sodium borohydride (SBH) is a solid reactant, and water is another reactant. The chemical hydride is stored as a solid in the reaction area. If an increased rate of reaction between the chemical hydride and the water is desired, a solid acid, such as malic acid, can be mixed with the chemical hydride, or acid can be added to the water. A chemical hydride can be formed into a solid mass, e.g., to reduce the amount of unreacted chemical hydride contained in the effluent that exits the reaction area. In an example, a mixture including about 50 to 65 weight percent SBH, about 30 to 40 weight percent malic acid and about 1 to 5 weight percent polyethylene glycol can be pressed into a pellet. Optionally, up to about 3 weight percent surfactant (anti-foaming agent), up to about 3 weight percent silica (anti-caking agent) and/or up to about 3 weight percent powder processing rheology aids can be included. The density of the pellet can be adjusted, depending in part on the desired volume of hydrogen and the maximum rate at which hydrogen is to be produced. A high density is desired to produce a large amount of hydrogen from a given volume. On the other hand, if the pellet is too porous, unreacted SBH can more easily break away and be flushed from the reaction area as part of the effluent. One or more pellets of this solid reactant composition can be used in the hydrogen generator, depending on the desired volume of hydrogen to be produced by the hydrogen generator. The ratio of water to SBH in the hydrogen generator can be varied, based in part on the desired amount of hydrogen and the desired rate of hydrogen production. If the ratio is too low, the SBH utilization can be too low, and if the ratio is too high, the amount of hydrogen produced can be too low because there is insufficient volume available in the hydrogen generator for the amount of SBH that is needed.

It may be desirable to provide for cooling of the hydrogen generator during use, since the hydrogen generation reactions can produce heat. The housing may be designed to provide coolant channels. In one embodiment standoff ribs can be provided on one or more external surfaces of the housing and/or interfacial surfaces with the fuel cell system or device in or on which the hydrogen generator is installed or mounted for use. In another embodiment the hydrogen generator can include an external jacket around the housing, with coolant channels between the housing and external jacket. Any suitable coolant can be used, such as water or air. The coolant can flow by convection or by other means such as pumping or blowing. Materials can be selected and/or structures, such as fins, can be added to the hydrogen generator to facilitate heat transfer.

It may also be desirable to provide means for heating the hydrogen generator, particularly at startup and/or during operation at low temperatures.

The hydrogen generator can include other components, such as control system components for controlling the rate of hydrogen generation (e.g., pressure and temperature monitoring components, valves, timers, etc.), safety components such as pressure relief vents, thermal management components, electronic components, and so on. Some components used in the operation of the hydrogen generator can be located externally rather than being part of the hydrogen generator itself, making more space available within the hydrogen generator and reducing the cost by allowing the same components to be reused even though the hydrogen generator is replaced.

The hydrogen generator can be disposable or refillable. For a refillable hydrogen generator, reactant filling ports can be included in the housing, or fresh reactants can be loaded by opening the housing and replacing containers of reactants. If an external pump is used to pump liquid from the reservoir to the reaction area, an external connection that functions as a fluid reactant composition outlet to the pump can also be used to refill the hydrogen generator with fresh liquid. Filling ports can also be advantageous when assembling a new hydrogen generator, whether it is disposable or refillable. If the hydrogen generator is disposable, it can be advantageous to dispose components with life expectancies greater than that of the hydrogen generator externally, such as in a fuel cell system or an electric appliance, especially when those components are expensive.

The liquid reservoir, reaction area and byproducts containment area can be arranged in many different ways. As described above, by arranging the byproducts containment area in a volume exchanging relationship with one or both of the liquid reservoir and the reaction area, the hydrogen generator can be more volume efficient and provide a greater amount of hydrogen per unit of volume of the hydrogen generator. Other considerations in arranging the components of the hydrogen generator include thermal management (adequate heat for the desired reaction rate and dissipation of heat generated by the reactions), the desired locations of external connections (e.g., for hydrogen gas, liquid flow to and from an external pump), any necessary electrical connections (e.g., for pressure and temperature monitoring and control of fluid reactant flow rate), and ease of assembly.

FIG. 1 is a perspective view of an embodiment of a hydrogen generator 10 with a housing 12 and a connector 14 for connecting to the rest of a fuel cell system. The connector 14 includes a hydrogen outlet 20. It can also include a liquid outlet 16 and a liquid inlet 18, when liquid is transported from a reservoir within the housing via an external pump, for example. Alternatively, means for moving the liquid out of the reservoir (e.g., an internal pump, an elastic liquid reservoir, means for applying pressure to the liquid reservoir, etc.) can be included within the housing 12. The left side of the hydrogen generator 10 in FIG. 1 is shown in plan view in FIG. 2.

Figure 2:
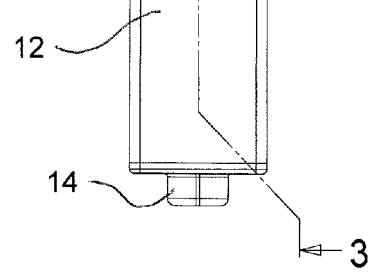
FIG. 2 is a plan view of a side of the hydrogen generator in FIG. 1.
Figure 3:
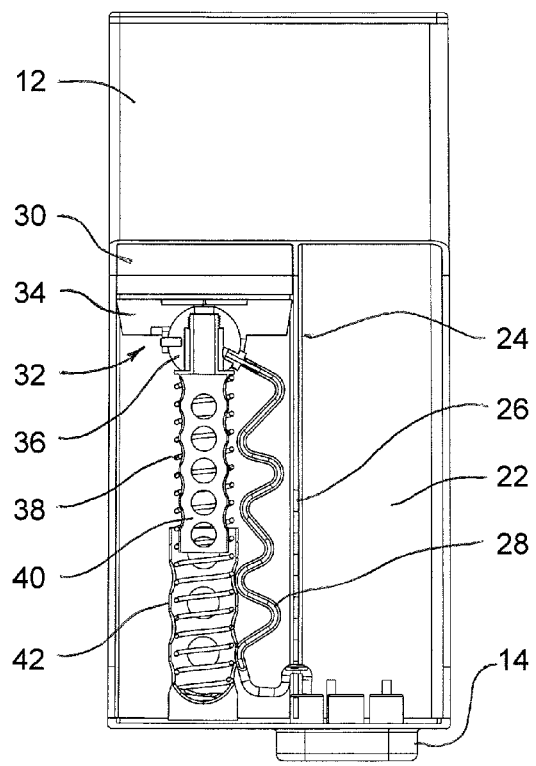
FIG. 3 is a partial sectional view of the hydrogen generator sectional along line 3-3 in FIG. 2.

FIG. 3 is a partial sectional view along line 3-3 in FIG. 2. A compartment 22 to accommodate a liquid reservoir (not show) is separated from the remainder of the hydrogen generator 10 by a partition 24 that includes large perforations 26. In FIG. 3 a pellet 30 containing a solid reactant composition is disposed on the opposite side of the partition from the liquid reservoir compartment 22, although other arrangements are possible. The solid reactant composition can be powdered, granular or formed into a unitary or multiple structures, for example. Liquid is transported to a follower assembly 32 via a liquid transport tube 28. The follower assembly 32 includes a follower 34, having a surface facing the pellet 30, and a ball joint including a ball 36. The follower assembly 32 is biased toward the pellet 30 so the follower 34 is in contact with the pellet 30. The follower assembly 32 can be biased by a spring 38. If the spring is a compression coil spring as shown in FIG. 3, guides such as guides 40 and 42 can be included to keep the spring 38 aligned and prevent it from buckling. In the embodiment shown in FIG. 3, the internal spring guide 40 is a part of the follower assembly 32, and the external spring guide 42 is attached to the housing 12. Both guide springs 40, 42 are hollow tubes with large openings in their walls. Other types of spring guides can be used.

Liquid is transported from the liquid reservoir, through the liquid transport tube, to the follower assembly 32. The liquid flows to the surface of the follower 34 facing the pellet 30, where it contacts and reacts with a solid reactant in the pellet 30 to produce hydrogen gas and byproducts. The hydrogen gas and byproducts flow around the periphery of and/or through passageways through the follower 34 and into spaces within the housing 12, such as spaces around the spring 38 and spring guides 40, 42. If the hydrogen outlet 20 is on the same side of the partition 24 as compartment 22, the hydrogen gas can flow through the perforations 26 in the partition 24 and out of the hydrogen generator 10 through the hydrogen outlet 20 as needed. Byproducts can also flow through the perforations 26 and into unoccupied space in the liquid reservoir compartment 22. As shown in FIG. 3, the hydrogen generator 10 is partially used. In an unused state the pellet 30 will be larger, the follower 34 will not be biased as far as shown in FIG. 3, and the spring 38 will be more fully compressed.

In the embodiment shown in FIG. 3, the area around the follower assembly 32, spring 30 and spring guides 40, 42 and unoccupied space in the liquid reservoir compartment 22 serve as a byproduct containment area. The byproduct containment area is in a volume exchanging relationship with the reaction area—as the pellet is consumed during the hydrogen generation, the volume of the reaction area becomes smaller and the volume of the byproduct containment area becomes correspondingly larger. If the liquid reservoir includes a container that can collapse as liquid exits therefrom, the byproduct containment area can also be in a volume exchanging relationship with the liquid reservoir.

Figure 4:
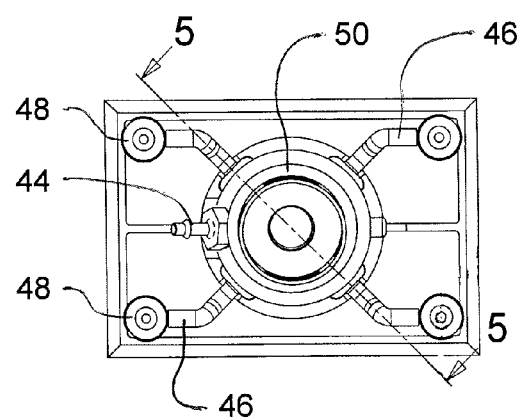
FIG. 4 is a sectional view of the follower assembly in the hydrogen generator in FIG. 3.
Figure 5:
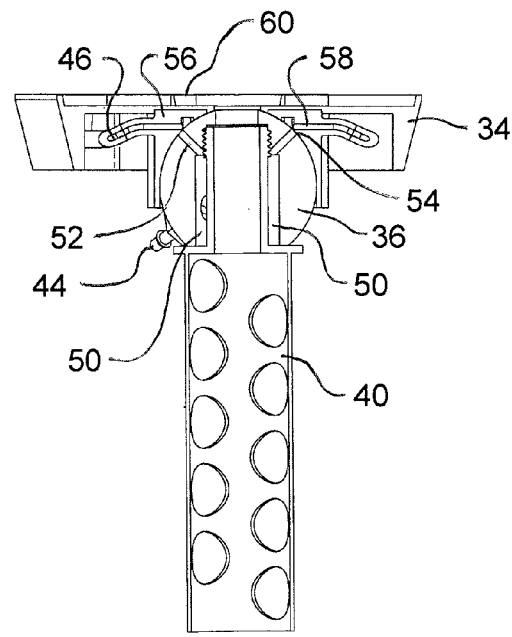
FIG. 5 is a cross-sectional view of the follower assembly in FIG. 4 along line 5-5.

The follower assembly 32 is shown in greater detail in FIGS. 4 and 5. FIG. 4 is a sectional view of the follower assembly 32, as viewed from the bottom of the hydrogen generator 10 in FIG. 3. The bottom surface of the follower 34 is also removed so internal features of the follower assembly 32 are visible. Liquid flows from the liquid transport tube 28 into the ball 36 through fitting 44. The liquid flows through the ball 36 as described below and through sleeves 46 and valves 48 to the opposite surface 60 of the follower 34.

FIG. 5 is a sectional view of the follower assembly 32 through line 5-5 in FIG. 4. Liquid enters the ball 36 through the fitting 44 and flows into a cavity 50 surrounding the tip of the spring guide 40 connected to the ball 36. Channels 52 lead to orifices 54 in the outer surface of the ball 36. When the orifices 52 in the ball 36 are aligned with corresponding orifices in valve seats 56 mounted in the follower 34, the liquid will flow through the valve seats 56 and into the sleeves 46 and valves 48 to the opposite side 60 of the follower 32. As shown in FIG. 5, the face 60 of the follower 34 is perpendicular to a longitudinal axis of the spring guide 40. In this orientation, the orifices 54 of the channels 52 in the ball 36 are partially aligned with corresponding orifices of the channels 58 in the valve seats 56 so that the flow of liquid from the ball 36 through the valve seat 56 is limited. Because the junction of the ball 36 and the follower 34 constitutes a ball joint, the follower 34 can pivot relative to the ball 36. When the follower 34 pivots, portions of the follower 34 are displaced downward (as oriented in FIG. 5), and those orifices of channels 58 that are displaced downward can become more completely aligned with the corresponding orifices 54 of channels 52, thereby increasing the liquid flow through those valve seats 56. Conversely, the orifices of channels 58 that are displaced upward can become nonaligned with the corresponding orifices 54, blocking the flow of liquid through those valve seats 56. During use of the hydrogen generator 10, if the surface of the pellet 30 adjacent to follower face 60 is not evenly consumed, the less consumed portions will tend to press more against the follower 34, causing it to pivot, increasing the flow of liquid to those portions of follower face 60 that are displaced downward and decreasing the flow of liquid to those portions of the follower face 60 that are displaced upward relative to the perpendicular orientation of follower 34 shown in FIG. 5.

Because the follower assembly includes an articulated joint, the face of the follower adjacent to the pellet can move to correspond better with the adjacent surface of the pellet. This can provide more uniform distribution of liquid to the adjacent surface of the pellet, more uniform utilization of the reactant composition of the surface of the pellet adjacent to the follower, and, consequently, a more uniform rate of hydrogen generation, more complete utilization of the reactants and a greater total volume of hydrogen generated. These advantages can be further enhanced by separately controlling liquid flow to different areas on the face of the pellet, so more liquid is available where most useful and less liquid is available where least useful.

All references cited herein are expressly incorporated herein by reference in their entireties. To the extent publications and patents or patent applications incorporated by reference contradict the disclosure contained in the present specification, the present specification is intended to supersede and/or take precedence over any such contradictory material.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

The invention claimed is:

1. A hydrogen generator comprising a housing; a reaction area; a fluid reservoir; a pellet comprising a first reactant within the reaction area; a fluid comprising a second reactant within the fluid reservoir; a fluid flow path between the fluid reservoir and the reaction area; and a hydrogen outlet; wherein:

the fluid flow path comprises a follower assembly biased toward the pellet;

the follower assembly comprises an articulated joint and a pivotable follower, the follower positioned against an adjacent face of the pellet;

the second reactant can react with the first reactant in the reaction area to produce hydrogen gas and byproducts; and the follower is pivotable to orientations that maximize the contact area between the follower and the adjacent face of the pellet;

said hydrogen generator further comprising at least one of:

(a) a fluid control mechanism within the follower assembly, the follower further comprising a plurality of fluid outlets on a face facing the pellet, said fluid control mechanism comprising a plurality of valves configured to selectively adjust fluid flow through the plurality of fluid outlets based on an orientation of the follower; or (b) a fluid dispersion layer is disposed on a face of the follower.

2. The hydrogen generator according to claim 1, wherein the articulated joint comprises at least one of a ball joint, a universal joint and a flexible joint in which a component can bend.

3. The hydrogen generator according to claim 1, wherein the follower comprises a plurality of fluid outlets on a face facing the pellet.

4. The hydrogen generator according to claim 3, wherein the follower assembly comprises a fluid control mechanism configured to selectively adjust fluid flow through the plurality of fluid outlets based on an orientation of the follower.

5. The hydrogen generator according to claim 4, wherein the follower comprises at least a portion of the fluid control mechanism.

6. The hydrogen generator according to claim 4, wherein the fluid control mechanism comprises a plurality of valves.

7. The hydrogen generator according to claim 4, wherein the follower can pivot in response to the uneven consumption of the pellet during operation of the hydrogen generator, the pivoting giving rise to a redistribution of fluid flow through the plurality of fluid outlets on a face of the follower adjacent to the pellet.

8. The hydrogen generator according to claim 1, wherein a fluid dispersion layer is disposed on a face of the follower.

9. The hydrogen generator according to claim 8, wherein the fluid dispersion layer comprises a porous, compressible material.

10. The hydrogen generator according to claim 1, further comprising filter elements capable of separating the hydrogen gas from the byproducts before passing through the hydrogen outlet, said filter elements located in one or more of locations including:

(a) in a space around or opening through the follower;

(b) within a byproduct containment area or (c) between the reaction area and the hydrogen gas outlet.

11. The hydrogen generator according to claim 1, wherein the follower further comprises peripheral spaces, through-passage openings, or both peripheral spaces and through-passage openings which can allow hydrogen gas and the byproducts flow around or through the follower before passing through the outlet during operation of the hydrogen generator.

12. The hydrogen generator according to claim 1, wherein the follower further comprises peripheral spaces which can allow hydrogen gas and the byproducts to flow around the follower before passing through the outlet during operation of the hydrogen generator.

13. The hydrogen generator according to claim 1, wherein the follower further comprises through-passage openings which can allow hydrogen gas and the byproducts to flow through the openings in the follower during operation of the hydrogen generator.

14. The hydrogen generator according to claim 1, further comprising
a byproduct containment area, wherein
the byproduct containment area is separated from the reaction area by the follower.

15. The hydrogen generator according to claim 14, wherein the byproduct containment area separates the reaction area and the fluid reservoir.

16. The hydrogen generator according to claim 14, wherein the reaction area and the byproduct containment area are in a volume exchanging relationship.

17. The hydrogen generator according to claim 14, wherein the fluid reservoir and the byproduct containment area are in a volume exchanging relationship.

18. The hydrogen generator according to claim 14, wherein the byproduct containment area contains one or more filter members.

19. The hydrogen generator according to claim 18, wherein the one or more filter members include an initially compressed filter that can expand as the byproduct containment area enlarges.

20. The hydrogen generator according to claim 1, wherein the fluid reservoir comprises a flexible container.

21. The hydrogen generator according to claim 1, wherein the reaction area is disposed adjacent to the fluid reservoir.

22. The hydrogen generator according to claim 1, wherein the fluid is transportable through the fluid flow path by a pump, either within or outside the hydrogen generator.

23. The hydrogen generator according to claim 1, wherein the fluid is transportable through the fluid flow path by pressure applied to the fluid reservoir, by a biasing member or a gas.

24. The hydrogen generator according to claim 1, wherein the follower is biased by a spring.

25. The hydrogen generator according to claim 1, wherein the first reactant comprises a chemical hydride.

26. The hydrogen generator according to claim 25, wherein the chemical hydride is a borohydride.

27. The hydrogen generator according to claim 26, wherein the borohydride is sodium borohydride.

28. The hydrogen generator according to claim 1, wherein the pellet further comprises a reaction accelerator, preferably an acid, more preferably one or more of malic, citric, succinic and tartaric acid.

29. The hydrogen generator according to claim 1, wherein the pellet further comprises a catalyst.

30. The hydrogen generator according to claim 1, wherein the fluid further comprises a catalyst.

* * * * *